United States Patent [19]

Kurtz et al.

[11] Patent Number: 4,608,221
[45] Date of Patent: Aug. 26, 1986

[54] PROCESS FOR REDUCING DRAW RESONANCE IN POLYMERIC FILM

[75] Inventors: Stuart J. Kurtz, Martinsville; Ernest H. Roberts, Somerset; Peter J. Lucchesi, Middlesex, all of N.J.

[73] Assignee: Union Carbide Corporation, Danbury, Conn.

[21] Appl. No.: 687,250

[22] Filed: Dec. 28, 1984

[51] Int. Cl.⁴ .............................................. B29C 47/88
[52] U.S. Cl. ..................... 264/556; 264/171; 264/237; 264/284; 264/348; 425/72 R; 425/224; 425/326.1
[58] Field of Search ............... 264/237, 284, 348, 171, 264/556, 40.1, 40.3; 425/72 R, 326.1, 135, 224

[56] References Cited

U.S. PATENT DOCUMENTS

| | | |
|---|---|---|
| 2,544,467 | 3/1951 | Michel ................................. 425/135 |
| 3,125,616 | 3/1964 | Cook et al. .......................... 264/40.3 |
| 3,468,995 | 9/1969 | Nelson ................................ 264/237 |
| 3,527,851 | 9/1970 | Bulgin ............................... 425/72 R |
| 3,784,347 | 1/1974 | Robinson .......................... 425/326.1 |
| 3,795,474 | 3/1974 | Heyer ................................. 264/556 |
| 3,847,516 | 11/1974 | Hoffman ........................... 425/72 R |
| 4,066,729 | 1/1978 | Van Cappellen .................... 425/224 |
| 4,148,851 | 4/1979 | Tani et al. ............................. 264/23 |
| 4,255,365 | 3/1981 | Heyer .............................. 264/176 R |
| 4,486,377 | 12/1984 | Lucchesi et al. ..................... 264/237 |

FOREIGN PATENT DOCUMENTS 2124139A 2/1984 United Kingdom .

*Primary Examiner*—Jeffery Thurlow
*Attorney, Agent, or Firm*—C. J. Vicari

[57] ABSTRACT

A process for reducing draw resonance of a polymeric molten film susceptible to draw resonance under conditions which would cause draw resonance by extruding the film from a die and rapidly cooling said film in a rapid cooling zone containing a pressure roll and chill roll by providing a tensioning device between said die and the nip of said pressure and chill roll, said tensioning device providing a substantially friction free surface with respect to said moving film.

9 Claims, 4 Drawing Figures

4,608,221

PROCESS FOR REDUCING DRAW RESONANCE IN POLYMERIC FILM

BACKGROUND OF THE INVENTION

1. Field of Invention

This invention relates to an improvement in a process for reducing draw-resonance in polymeric film.

2. Definitions

By draw-down is meant the stretching of an extruded web or film in the direction of flow and sometimes also in the transverse direction.

By "draw ratio" is meant the film or coating velocity at the rapid cooling zone or station divided by the average extrudate velocity emerging from a die. This can be approximated by using the inverse of thicknesses which can be expressed as $$R = \frac{1}{t_f} / \frac{1}{t_o}$$

wherein $t_f$ is the thickness of film or coating;
$t_o$ is the thickness of film extrudate at the die exit
R is the draw ratio By "draw resonance" or surging is meant periodic variations in the molten film occurring between the die and the rapid cooling zone. It occurs when the draw ratio exceeds a critical value. Draw resonance or surging can be thought of as an instability phenomenon manifested during the drawing down of a material coming from an extruder, more or less homogeneously. The instability manifests itself in the occurrence of periodic fluctuations in the extruded web (film) dimensions such as film thickness when a critical value of the draw ratio is exceeded. Surging may be so extreme as to actually break a web or film that extrudes from a die and totally shuts down an extrusion coating or film process.

3. Description of the Prior Art

Certain polymeric resins and particularly polyolefin resins are not entirely satisfactory for commercial operations such as melt embossing and/or extrusion coating applications. This has been primarily attributed to the phenomenon of draw resonance.

Normally, the onset of draw resonance with certain polymeric resins requires two fixed points; an extrusion die and a rapid cooling zone and both are present in extrusion coating and embossing processes. Draw resonance for certain resins occurs at characteristic draw ratios, often as low as 5 to 1. In both melt embossing and extrusion coating applications, draw resonance can occur with certain resins because die gaps are usually 20-40 mils and the thickness of the drawn down final film or coating is usually equal to or less than 1 mil. Thus, the draw ratio may be in excess of the critical draw ratio of certain resins.

One possible method for reducing draw resonance is to lower the draw ratio which is approximately equal to the ratio of the die gap to the film or coating thickness. However, at the high takeoff speeds (equal to or greater than 500 FPM) and thin gauges (equal to or less than 1 mil) encountered in these processes, it is not commercially feasible to reduce the die gap, thereby lowering the draw ratio, because of constraints of head pressure and melt fracture. It has presently been proposed to overcome draw resonance with difficult processing polymeric materials particularly polyolefins such as linear low density polyolefins (LLDPE), high density polyolefins (HDPE) and polypropylene by using mixtures of these polymeric materials with easier processing resins such as disclosed in U.S. Pat. No. 4,339,507. Unfortunately, however, in addition to higher raw material costs, the final product does not have the inherent property advantages achieved by using the LLDPE, HDPE, or polypropylene alone.

Another method for reducing draw resonance is disclosed in U.S. Pat. No. 4,486,377. Briefly, there is disclosed a process for reducing draw resonance of a polymeric film wherein a fluid medium is directed against the molten film substantially midway between the die and a rapid cooling zone.

Although this process is extremely effective in reducing draw resonance, there are however few instances where the film exhibits slight traces of draw resonance due to the difficulty of manufacturing and directing the fluid medium.

SUMMARY OF THE INVENTION

A process for reducing draw resonance of a polymeric molten film susceptible to draw resonance under conditions which would cause draw resonance by extruding the film from a die and rapidly cooling said film in a rapid cooling zone containing a pressure roll and a chill roll, which comprises extruding said film from said die to said cooling zone, providing a tensioning device between said die and the nip of said pressure roll and chill roll, said tensioning device providing a substantially friction free surface with respect to said moving film, said tensioning device being responsive to tensioning variations of said moving film between said die and said cooling zone and being adapted to provide a substantially constant tension in said moving film.

DESCRIPTION OF THE PREFERRED EMBODIMENTS

Figure 1:
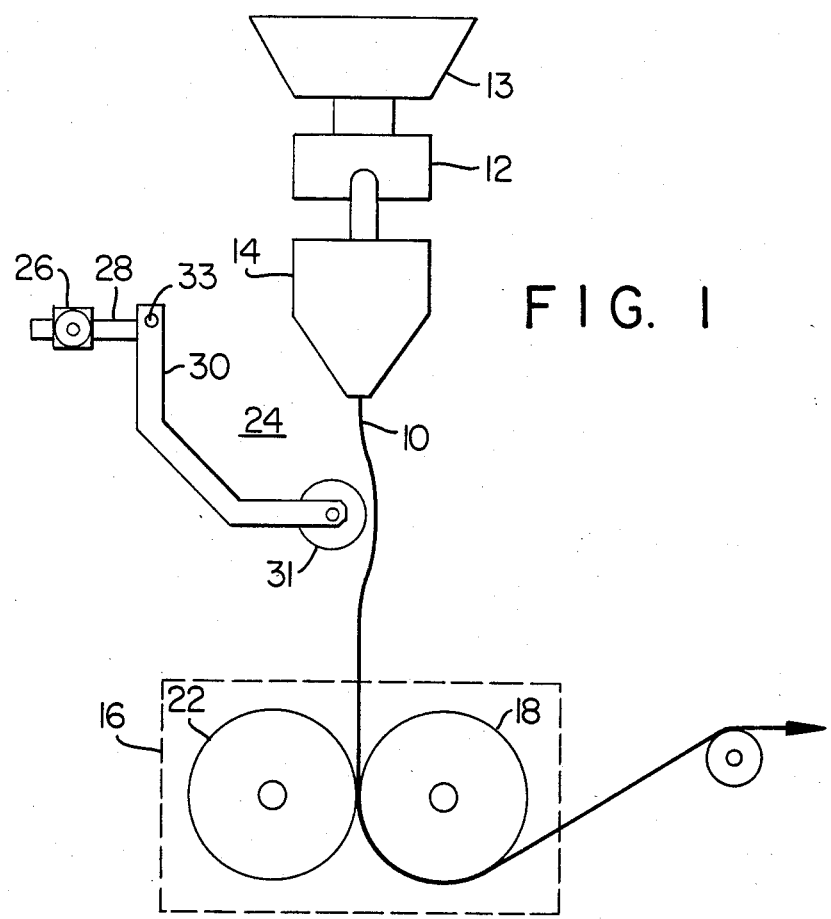
FIG. 1 is a schematic representation of the process of the invention showing an extruder, a die, a molten film exiting the die, a rapid cooling zone or station and a tensioning device disposed between the die and rapid cooling station.

For purposes of ease of description only, the present invention will be described herein by reference to linear, low density ethylene hydrocarbon copolymers. It is not the intention to thereby limit the invention. As described more fully hereinbelow, the invention is generally applicable to polymeric resins such as polypropylene, high density polyethylene, and certain high pressure low density polyethylene (HPLDPE) which have a tendency to draw resonate under certain operating conditions, between an extrusion die and a rapid cooling station in extrusion coating and/or embossing processes.

Linear, low density ethylene hydrocarbon copolymers (LLDPE) heretofore have not been satisfactorily used commercially as extrusion coating compositions. Extrusion coating resins are thought to have certain characteristics. For example, in general, the highest coating speeds have been obtained with extrusion coating resins having the lowest melt strength. See Kaltenbacher et al., "The Use of Melt Strength in Predicting the Processability of Polyethylene Extrusion Coating Resins," 50 TAPPI 20-26 (January 1967). Linear, low density ethylene hydrocarbon copolymers are thought to possess low melt strength which would lead one skilled in the art to believe that they would provide good extrusion coating compositions.

However, applicants have found that there are deficiencies associated with the use of certain polymeric resins such as unmodified, linear, low density ethylene hydrocarbon copolymer resins as extrusion coating compositions. Process deficiencies include draw resonance which can lead to melt breakage.

In an extrusion coating or embossing process, the most significant deficiency in the use of unmodified, linear, low density ethylene hydrocarbon copolymer is that of draw resonance. Draw resonance, in these cases, occurred at draw ratios that were exceptionally low, i.e., the amount of drawdown that could be done was not adequate for proper fabrication. When unmodified, linear, low density ethylene hydrocarbon copolymer was used for extrusion coating, maximum stable draw ratios were found to be less than 10 to 1. In most commercial extrusion coating operations, draw ratios greater than 20 to 1 are sought.

Low Density Polyethylene: Rheology

The rheology of polymeric materials depends to a large extent on molecular weight and molecular weight distribution. Studies of high pressure low density polyethylene have also shown the importance of long chain branching. In extrusion coating, two aspects of rheological behavior are important: shear and extension. Within a film extruder and extrusion die, a polymeric melt undergoes severe shearing deformation. As the extrusion screw pumps the melt to and through an extrusion coating die, the melt experiences a wide range of shear rates. Most film extrusion processes are thought to expose the melt to shear at rates in the 50-2000 sec.$^{-1}$ range.

Polymeric melts are known to exhibit what is commonly termed shear thinning behavior, i.e., non-Newtonian flow behavior. As shear rate is increased, viscosity (the ratio of shear stress, $\tau$ to shear rate, $\dot{\gamma}$) decreases. The degree of viscosity decrease depends upon the molecular weight, its distribution and molecular configuration, i.e., long chain branching of the polymeric material. Short chain branching has little effect on shear viscosity. In general, broad molecular weight distribution resins show enhanced shear thinning behavior in the shear rate range common to extrusion in extrusion coating. Long chain branching can also enhance this behavior. Narrow molecular weight distribution resins exhibit reduced shear thinning behavior at extrusion shear rates.

The consequences of the aforementioned differences in the effect of molecular structure on shear thinning are that narrow distribution resins (such as linear, low pressure, ethylene hydrocarbon copolymers) require higher power and develop higher pressures during extrusion than broad molecular weight distribution resins (such as high pressure, low density polyethylenes) of equivalent melt index (ASTM D-1238). In order to compensate for high die pressures, it is often necessary to run with relatively large die gap openings, e.g., greater than 20 mils. Such die gap openings require a high drawdown, usually greater than 20 to 1.

The rheology of polymeric materials is customarily studied in shear deformation. In shear, the velocity gradient of the deforming resin is perpendicular to the flow direction. This mode of deformation is experimentally convenient but does not convey the essential information for understanding material response in extrusion coating processes. As one can define a shear viscosity in terms of shear stress and shear rate, i.e.,:

$$\eta_{shear} = \tau_{12}/\dot{\gamma} \qquad (1)$$

where
- $\eta_{shear}$ = shear viscosity (poise)
- $\tau_{12}$ = shear stress (dynes/cm$^2$)
- $\dot{\gamma}$ = shear rate (sec$^{-1}$)

an extensional viscosity can be defined in terms of normal stress and strain rate, i.e.:

$$\eta_{ext} = \tau/\dot{\epsilon} \qquad (2)$$

- $\eta_{ext}$ = extensional viscosity (poise)
- $\tau$ = normal stress (dynes/cm$^2$)
- $\dot{\epsilon}$ = strain rate (sec$^{-1}$)

In pure extensional flow, unlike shear flow, the velocity gradient is parallel to the flow direction. Commercial extrusion processes involve both shear and extensional deformations. In extrusion coating, as well as in film extrusion (tubular blown and slot cast) the extensional rheology characteristics of a resin are exceedingly important. They may, in fact, dominate the process.

Extensional viscosity can be measured by a number of experimental techniques (see, for example, J. M. Dealy, Rheometers for Molten Plastics, Van Nostrand, Reinhold Company, New York, 1982). The procedure used herein is a constant strain rate method. Briefly, the method uses a servo-controlled Instron tensile testing machine. The ends of a molten ring of polymer, immersed in a silicone oil bath, are separated at an accelerating rate according to the following relationship.

$$L(t) = L_o \exp(\dot{\epsilon} t) \qquad (3)$$

where
- L(t) = jaw separation at time t (cm)
- $L_o$ = initial jaw separation (cm)
- $\dot{\epsilon}$ = strain rate (sec$^{-1}$), a constant
- t = time (sec)

A force transducer measures load during the deformation. Extensional viscosity is calculated by dividing stress by strain rate and is determined as a function of displacement or time during the deformation at a constant temperature of 150° C.

When certain high pressure, low density polyethylene melts such as extrusion coating grades are deformed according to equation (3), extensional viscosity is observed to increase at an accelerating rate with log time. The melt is said to strain harden. This strain hardening intensifies as the strain rate is increased. In some cases, the melt appears to exhibit unbounded stress growth.

Transition metal catalyzed, ethylene hydrocarbon copolymers do not, in general, show accelerating stress growth. Certain broad molecular weight distribution resins do strain harden, but their extensional viscosity (log $\eta_{ext}$) seems to increase linearly with log time. Certain narrow molecular weight distribution resins, such as those which are herein described, show little strain hardening when strain rates are low.

High pressure, low density polyethylene can be considered "soft" in shear and "stiff" in extension when compared to linear ethylene hydrocarbon copolymers of narrow molecular weight distribution. Ethylene hydrocarbon copolymers having a narrow molecular weight distribution exhibit the opposite rheology. They are "stiff" in shear and "soft" in extension. The terms "soft" and "stiff," as used herein, refer to the relative magnitude of shear and extensional viscosity when comparing the rheology of high pressure, low density polyethylene and linear ethylene hydrocarbon copolymers of narrow molecular weight distribution.

The consequences of the differences in strain hardening in the extensional viscosity characteristics are as follows. Certain high pressure, low density polyethylene resins tend to build up stress at high extrusion coating rates and drawdown in an extrusion coating process. When these "high pressure" resins reach a point where the stress exceeds the melt strength, the resins break or rupture. In contrast to the behavior of these high pressure, low density polyethylene resins, low pressure, low density ethylene hydrocarbon copolymer resins can be drawn down considerably without reaching stresses to cause melt breakage. On the other hand, by not building up significant stresses with drawing, it is believed that a low pressure, low density polyethylene melt becomes more susceptible to draw resonance.

Linear, Low Density Ethylene Hydrocarbon Copolymers

Suitable linear, low density ethylene hydrocarbon copolymers for the extrusion coating compositions of the present invention are those copolymers of ethylene and one or more $C_3$ to $C_8$ alpha olefins having a density of about equal to or greater than 0.87 to equal to or less than 0.940 and preferably of about equal to or greater than 0.916 to equal to or less than 0.928. These copolymers can be made in a solution, slurry or gas phase process well known to those skilled in the art.

Also, suitable linear, low density ethylene hydrocarbon copolymers of this invention are those having a major mole percent of equal to or greater than 80 of ethylene and a minor mole percent (of equal to or less than 20) of one or more $C_3$ to $C_8$ alpha olefins. The $C_3$ to $C_8$ alpha olefins include propylene, butene-1, pentene-1, heptene-1, 4-methyl pentene-1, hexene-1, and octene-1.

Linear, low density ethylene hydrocarbon copolymers of the present invention normally have a standard melt index of equal to or greater than 0.5, preferably equal to or greater than 1.0 and most preferably equal to or greater than 2.0. Also, copolymers of this invention should have a standard melt index of equal to or less than 100, preferably equal to or less than 50, and most preferably equal to or less than 20.

Preferred linear, low density ethylene hydrocarbon copolymers for use in the extrusion coating compositions of the present invention are those possessing a molecular weight distribution, Mw/Mn, of equal to or greater than 2.4 to equal to or less than 5.0 and preferably of about equal to or greater than 2.8 to equal to or less than 3.4. These copolymers have a melt flow ratio of about equal to or greater than 20 to equal to or less than 37 and preferably, equal to or greater than 25 to equal to or less than 32. The melt flow ratio of equal to or greater than 20 to equal to or less than 32 thus corresponds to a Mw/Mn value range of about 2.4 to 3.3 and the melt flow ratio range of equal to or greater than 25 to equal to or less than 37 corresponds to a Mw/Mn range of about 2.8 to 3.6.

The melt flow ratio equals to Flow Rate (ASTM 1238, Condition F) divided by the Melt Index (ASTM D1238 Condition E).

These ethylene hydrocarbon copolymers also have a total unsaturation content of about equal to or greater than 0.1 to equal to or less than 0.3 C=C per 1000 carbon atoms and preferably of about equal to or greater than 0.14 to equal to or less than 0.24 C=C per 1000 carbon atoms.

Preferred linear, low density ethylene copolymers for use in the present invention include those which may be produced in accordance with the procedures set forth in U.S. Pat. No. 4,302,566 in the names of F. J. Karol et al. and entitled "Preparation of Ethylene Copolymers in Fluid Bed Reactor", and the procedures set forth in U.S. Pat. No. 4,302,565 in the names of G. L. Goeke et al. and entitled "Impregnated Polymerization Catalyst, Process for Preparing, and Use for Ethylene Copolymerization" as well as procedures which will produce ethylene hydrocarbon copolymers with properties as heretofore described.

Other linear, low density ethylene hydrocarbon copolymers preferred for use in the present invention are those which can be prepared as described in U.S. Pat. No. 4,011,382, entitled "Preparation of Low and Medium Density Ethylene Polymer in Fluid Bed Reactor" by I. J. Levine et al., the disclosure of which is incorporated herein by reference.

Extrusion Coating Compositions

The extrusion coating compositions of the present invention may be used in any of the forms of such compositions which are commonly employed in the extrusion coatings art. Extrusion coating compositions of this invention optionally may contain between 100 and 1000 ppm of various chill roll release agents such as low molecular weight polyethylene glycol and fatty acid amides; between 1 and 15% by weight, respectively, of fillers and pigments such as carbon black, titanium dioxide, clays, diatomaceous earth, calcium carbonate and the like; between 20 and 150 ppm of antioxidants, such as butylated hydroxytoluene and hindered phenols, and the like.

Extrusion Coating Conditions

The resins of this invention as described herein, can be extruded directly on a variety of substrates to form composite sheets or articles by methods which are well known in the art. The substrates include materials such as polyethylene, paper, aluminum foil, etc. The coating equipment may include a single extrusion line as shown typically in FIG. 3 or more than one extrusion line in order to apply multiple layers of substrates together.

Extrusion can be accomplished via a screw-type extruder which comprises a plastic material feed section, one or more screws enclosed in an extruder barrel, a mixing section at the end of the one or more screws, and a forming die beyond the mixing section. In such an extrusion apparatus, the polymer in a dry, granular or pellet form is fed from a hopper to the feed section of the extruder and forwarded by rotation of the screws, passes through the extruder barrel wherein it is heated and mechanically worked to melt the polymer before it emerges from the forming die as a web.

Figure 3:
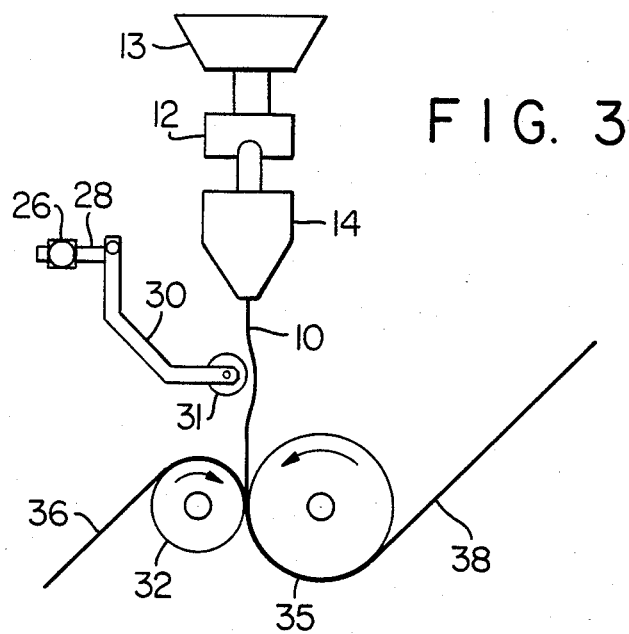
FIG. 3 is a schematic representation of a typical basic extrusion coating process showing the tensioning device disposed between the die and the rapid cooling zone e.g. a chill roll and pressure roll and showing the molten film being coated onto a substrate.

In a basic typical extrusion coating operation, as shown in FIG. 3, the LLDPE is fed into an extruder hopper. By gravity feed, the LLDPE goes into a standard polyethylene screw (not shown) in an extrusion coating extruder. The polymer enters the feed section as a solid and is conveyed, compressed and begins melting in the transition section of the screw extruder. It then proceeds with the melting and pumping into a so-called metering section of the screw, at which point temperature also increases, possibly assisted by heat transfer to the melt on the barrel side. The melt then flows through the extruder, optionally past a mixing head (not shown) to eliminate any unmelted material and to homogenize the melted material, optionally also followed by another metering section which will increase the pumping to a pressure necessary to extrude through the die. The melt is more or less homogeneous in temperature and uniformity as it passes through and out of the die forming a molten film. This web then is drawn down and coated onto a substrate. Thus, as shown in FIG. 3, the substrate is directed by the pressure roll in contact with the molten film and the molten film is coated onto the substrate by the compressing action between the pressure roll and the chill roll. The web is cooled by the chill roll and rubber roll (back-up) forming a nip and drawn off with the substrate onto other take-up rolls. It then proceeds through various treatment stations to a wind-up system where the coated substrate can then be wound up.

In the extruder, the resin is subjected to temperatures ranging from about 10° C. above ambient up to 343° C. The extrudate emerges at temperatures from 135° C. to 343° C., preferably from 191° C. to 332° C., under varying conditions of head pressure. Average residence times in the extruder can vary from about 0.5 to 15 minutes. The extrusion coating is usually formed in a uniform thickness of from about 0.1 to 10 mils thick.

Embossing Conditions

Figure 4:
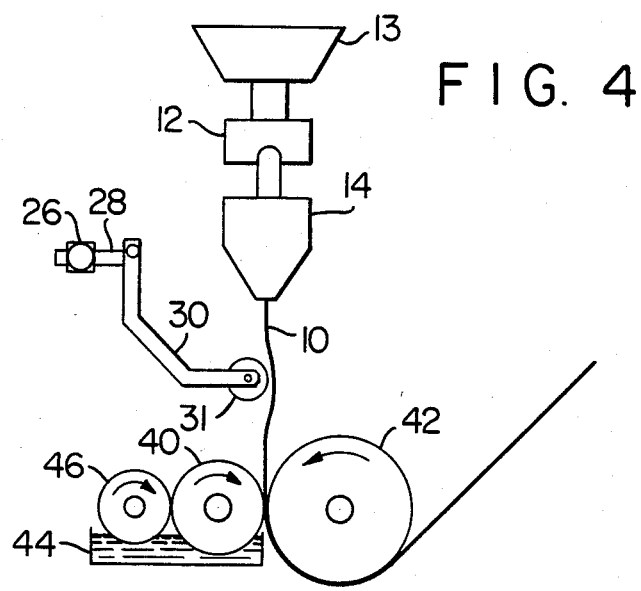
FIG. 4 is a schematic representation of a typical basic embossing process showing the tensioning device disposed between the die and the rapid cooling zone which includes an embossing roll, a nip roll, a wiper roll and a water bath.

In a typical basic melt embossing operation such as shown in FIG. 4, the LLDPE is fed into an extruder hopper. By gravity feed, the LLPDE goes into a polyethylene screw (not shown) in an extruder. The polymer enters the feed section as a solid and is conveyed, compressed and begins melting in the transition section of the screw extruder. It then proceeds with the melting and pumping into a so-called metering section of the screw, at which point temperature also increases, possibly assisted by heat transfer to the melt on the barrel side. The melt then flows through the extruder, optionally past a mixing head (not shown) to eliminate any unmelted material and to homogenize the melted material, optionally also followed by another metering section which will increase the pumping to a pressure necessary to extrude through the die. The melt is more or less homogenous in temperature and uniformity as it passes through and out of the die forming a molten film. This web then is drawn down into the nip of the embossing roll and a rubber nip roll as illustrated in FIG. 4. The rubber nip roll forces the molten film into the embossing roll, thus duplicating the surface pattern of the embossing roll. The web is simultaneously cooled by the embossing roll and drawn off onto other take-up rolls. It then proceeds through various treatment stations to a wind-up system where the embossed film can then be wound up.

In the extruder, the resin is subjected to temperatures ranging from about 10° C. above ambient up to 316° C. The extrudate emerges at temperatures from 135° C. to 316° C., preferably 191° C. to 304° C., under varying conditions of head pressure. Average residence times in the extruder can vary from about 0.5 to 15 minutes. The embossed film is usually formed in a uniform thickness of from about 0.5 to 5.0 mils thick.

Tensioning Device

The tensioning device utilized in the present invention provides a surface, such as an arcuate surface which can be moved such that tension remains approximately constant in the web or film. To accomplish this, a substantially frictionless surface is needed and can be provided by choice of materials of the surface, e.g., teflon and the like or alternatively and preferably can be accomplished by providing a permeable surface through which air, steam, or other fluid is directed so as to keep the melt from making contact with the surface.

The tensioning device is positioned so that a substantially friction free surface exerts a tensioning effect widthwise against the moving web at a point between the die and the rapid cooling zone (the nip of the rolls in the cooling zone) and preferably at a point substantially midway between the die and the rapid cooling zone.

In the preferred embodiment, a fluid medium such as air and the like is directed to the tensioning device from a source such as a conventional air blower (not shown) and the fluid enters a cylinder of the tensioning device which will move such that the tension remains constant in the web. The cylinder extends widthwise of the web and has a portion of its surface, i.e., the surface adjacent the web, which is permeable so that the air entering the cylinder can be released through the permeable surface. Thus, there is provided a permeable surface with air, steam or other inert fluid being used to keep the web from making contact with the surface of the cylinder.

The gap between the web and the solid surface of the cylinder is minimal and normally less than about 0.1 inch. The air pressure generated should be such as to just separate the molten web from the solid cylinder.

The fluid pressure in the cylinder should be such that fluid is discharged from the cylinder at a velocity which does not substantially distort the web but rather provides a cushioning effect for the web. In this manner, the web and the cylinder can simultaneously move away or towards a given position, depending on an increase or decrease in web tension and thus the tension fluctuation can be dampened out.

Reference is now made to the drawing and particularly FIG. 1 which schematically illustrates the process of the invention.

Specifically a molten web or film 10 is shown being extruded from Extruder 12 fed from Hopper 13, through a die 14 in a substantially downward direction where it is directed into a centered or an offset rapid cooling zone or station 16 containing a cooling or chill roll 18 and a nip or pressure roll 22. Thus, the necessary conditions for draw resonance are established, i.e., an essentially fixed point (die 14) and a fixed velocity take-off (the nip of the cooling roll 18 and the nip roll 22 which are in contacting relation.) As will be recognized by those skilled in the art, the molten film can also be extruded in other directions, e.g., horizontal. Details of the upstream apparatus are not given (e.g., the extruder, die, etc.) since conventional process and apparatus may be employed to melt and advance the polymer material to form the molten film or film, such conventional apparatus and process being determined by the resin used and by the end use requirements, of the molten film, e.g., extrusion coating, embossing and the like. Similarly, details of the downstream apparatus (e.g., the cooling means, nip means and take-up of the film) are also dependent on the end use requirements as stated above.

In a broad concept, therefore, two items are required i.e., extrusion die 14 and a rapid cooling zone or station 16 containing nip roll 22 and chill roll 18 and the conditions of operation are such that polymeric materials which are susceptible to draw resonance will draw resonate at the speeds encountered. Provision for reducing the incidence of draw resonance is provided by a tensioning device positioned against the moving molten web at a point, preferably midway between die 14 and chill roll 18 and nip roll 22. Thus and referring again to FIG. 1, there is provided tensioning device 24, which is shown as being positioned beside and below die 14 and cooling station 16 with a perforated cylinder positioned preferably approximately midpoint between die 14 and the nip of rolls 18 and 22 in the rapid cooling zone or station 16.

Tensioning device 24 is designed so as to provide a substantially friction free surface for contact with the moving molten film.

Figure 2:
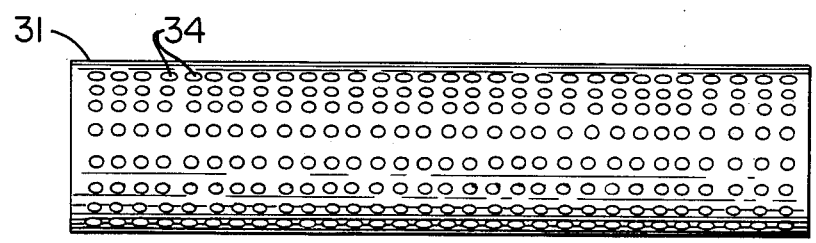
FIG. 2 is a front view of a portion of the tensioning device illustrating preferred surface disposed proximate the molten film and providing the substantially frictionless free contact with the molten film.

The tensioning device illustrated in the drawing utilizes a counter weight 26 adjustably positioned on member 28 which is associated with arms 30 each of which is disposed on each side of perforated cylinder 31. Referring to FIG. 2, it will be seen that perforated cylinder 31 is provided with a system of porous openings 34 disposed across its surface and which are adapted to discharge pressurized fluid received from a source (not shown) to the cylinder. The size of the porous openings should be such as to permit the air to form a blanket of air providing a cushioning effect over the perforated cylinder 31 and not to permit a discharge of air which will substantially distort the molten web. The perforated cylinder 31 extends transversely across the moving film 10 and the porous openings generally extend across the length of the perforated cylinder to an extent such that they preferably are equal in length to the width of the molten film emerging from the die. With this technique and apparatus, a constant tension can be maintained against the molten web by utilizing appropriate counter weight which urges the cylinder either towards or away from the film allowing the arms 30 to pivot with pivot shaft 33.

Although the tensioning device is shown with counterweight, it will be obvious to those skilled in the art that other type devices can be readily employed to maintain the appropriate tension of the perforated cylinder with the molten web. Thus, a spring mechanism can be substituted for the counter weight illustrated. If a spring mechanism is utilized, then the spring must permit the perforated cylinder 31 to respond less than the fluctuation time for draw resonance, normally one second or less. In other words, the spring must permit the system to respond faster than the natural draw resonance fluctuation time or period so that a constant force can be maintained in the molten web. Details of the spring mechanism are not illustrated since many conventional variations known to the art are available.

The process of the present invention is ideally suited for extrusion coating processes wherein the molten film is normally susceptible to draw resonance. The conditions and equipment for the extrusion coating are conventional. Thus as shown in FIG. 3, wherein like parts are designated by like reference numerals with respect to FIG. 1, resin is fed from the hopper 13 to the extruder 12 and thence to the die 14, molten film 10 is discharged from the die and is kept tense as it travels over the cushion of air discharged from perforated cylinder 31 as explained previously at a point between the die exit and the nip of pressure roll 32 and chill roll 35 in the rapid cooling zone. The molten film is coated onto substrate 36, cooled at the rapid cooling station or zone and then the coated product 38 leaving the rapid cooling zone is collected.

The process of the present invention is also ideally suited for an embossing process wherein film was susceptible to draw resonance under the conditions of operation. The conditions and equipment for the embossing process are conventional. Thus, as shown in FIG. 4, wherein like parts are designated by like reference numerals with respect to FIG. 1, resin is fed from hopper 13 to extruder 12 and thence to the die 14. Molten film 10 is discharged from the die and is kept tense as it travels over the cushion of air discharged from perforated cylinder 31 as explained previously at a point between the die exit and the nip of the rubber nip roll 40 and the embossing roll 42 in the rapid cooling zone. The molten film is embossed by the embossing roll 42 in contact with the rubber nip roll 40 and the embossed film is then taken up by the take-up rolls. Rapid cooling of the molten film is provided by direct contact with the metal embossing roll. Cooling of the rubber roll is provided, by internal cooling and/or the water bath 44 which cools the rubber nip roll 40 during rotation of the rubber nip roll. Wiper roll 46 removes excess water from rubber nip roll 40.

The following Example will further illustrate the invention.

EXAMPLE I

This Example compares the results attainable in extruding film for a melt embossing process between the constant tension device of the instant invention and the draw resonance eliminator (DRE) device of U.S. Pat. No. 4,486,377.

The resin employed was GRSN-7042 which is a 2.0 melt index, 0.918 g/cc density low pressure polymerized ethylene copolymer of ethylene and butene-1 and which is commercially available from Union Carbide Corp. The resin contained 5 wt.% DFDC-0093, masterbatch, which is also commercially available from Union Carbide Corp.

The extruder utilized was a 2½ inch diameter Egan extruder, having a barrel length to diameter of 28 to 1 and a 28 and 1 length to diameter (L/D) ratio polyethylene screw.

The extruder had a 75 horsepower Dynamic drive and 5 barrel heating zones. The die utilized was a 48 inch Black Clawson die deckled to a 30" width. The die which was center fed had a final land length of 1 inch, and a die gap setting of approximately 40 mils.

The fluid medium device of the draw resonance eliminator (DRE) consisted of a 2" diameter tube with ¼" wide×30" long slit. Air was supplied by a 1½ HP Blower identified as a N. Y. Blower, Model N14P available from The New York Blower Co., Willowbrook, Ill.

The fluid medium device was positioned approximately midway between the die and the nip point of the embossing station. The distance from the die exit to the nip point in the embossing station was about 7.5 inches and the difference from the molten polymeric film to the fluid medium device was about 1½ inches. Air was delivered from the fluid medium device at a range in FPM of 20–30 and the average FPM was 26.

In the instant invention, the constant tensioning device utilized a counter weight and a perforated cylinder as shown in the drawing. The gap between the molten web (film) and the surface of the cylinder was less than 0.1 inch and air was discharged through the perforations at a rate such as to provide a cushioning effect for the molten web rather than a distortion.

The results are shown in the following Table which compares the film produced with both devices.

TABLE I

| Unit | Constant Tension Device (CTD) | | | Draw Resonance Eliminator (DRE) | | |
|---|---|---|---|---|---|---|
| Line Speed, fpm | 200 | 250 | 300 | 200 | 250 | 300 |
| Average Film Thickness, mils | 1.20 | 0.94 | 0.73 | 1.40 | 1.11 | 0.88 |
| Standard Deviation | 0.046 | 0.055 | 0.046 | 0.17 | 0.15 | 0.14 |

As can be seen from Tabel I, with CTD, an average film thickness of 0.73 mils was produced at 300 fpm and the standard deviation was only 0.046. At the same line speed, the DRE gave an average film thickness of 0.88 mils and a standard deviation of 0.14. Thus, in comparison to the draw resonance eliminator (DRE), the constant tension device (CTD) permitted thinner guage film and better guage control.

What is claimed is:

1. A process for reducing draw resonance of a polymeric molten film susceptible to draw resonance under conditions which would cause draw resonance by extruding the film from a die and rapidly cooling said film in a rapid cooling zone containing a pressure roll and chill roll which comprises extruding said film from said die to said cooling zone, providing a tensioning device between said die and the nip of said pressure roll and chill roll, said tensioning device providing a substantially friction free surface with respect to said moving film, said tensioning device being responsive to tensioning variations of said moving film between said die and said cooling zone and being adapted to provide a substantially constant tension in said moving film.

2. A process according to claim 1 wherein said friction free surface with respect to said moving film is provided by a perforated cylinder having a system of porous openings disposed across its surface adapted to permit a discharge of fluid in contact with said moving film.

3. A process according to claim 2 wherein said porous openings extend transversely across the length of said perforated cylinder to a point substantially equal in length to the width of said moving film.

4. A process according to claim 3 wherein said fluid is air.

5. A process according to claim 4 wherein said air is discharged from said cylinder which does not substantially distort said film and provides a cushioning effect for said moving film.

6. A process according to claim 2 wherein the gap between said moving film and the surface of said cylinder is less than 0.1 mil.

7. A process according to claim 2 wherein said cylinder is positioned approximately mid-point between said die and the nip of said pressure roll and chill roll.

8. A process according to claim 1 wherein said polymeric film is a polyolefin film.

9. A process according to claim 8 wherein said polyolefin film is a linear, low density ethylene hydrocarbon copolymer.

* * * * *